United States Patent
Jung et al.

(10) Patent No.: US 9,837,034 B2
(45) Date of Patent: Dec. 5, 2017

(54) DISPLAY DEVICE INCLUDING CONTROL WIRE

(71) Applicant: Samsung Display Co., Ltd., Yongin-si, Gyeonggi-do (KR)

(72) Inventors: Kwang-Chul Jung, Seongnam-si (KR); Sun Hwa Lee, Yongin-si (KR); Il Gon Kim, Seoul (KR); Sang-Uk Lim, Yongin-si (KR); Jun Ki Jeong, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 17 days.

(21) Appl. No.: 15/041,822

(22) Filed: Feb. 11, 2016

(65) Prior Publication Data

US 2017/0032751 A1 Feb. 2, 2017

(30) Foreign Application Priority Data

Jul. 27, 2015 (KR) ........................ 10-2015-0106057

(51) Int. Cl.
*G09G 3/36* (2006.01)

(52) U.S. Cl.
CPC ......... *G09G 3/3648* (2013.01); *G09G 3/3677* (2013.01); *G09G 2300/0426* (2013.01); *G09G 2300/08* (2013.01)

(58) Field of Classification Search
CPC ............. G02F 1/136286; G02F 1/1341; G02F 1/133377; G02F 1/136209
See application file for complete search history.

(56) References Cited

U.S. PATENT DOCUMENTS

| 8,760,378 B2* | 6/2014 | Lee ...................... G09G 3/3655 345/211 |
| 2008/0129652 A1* | 6/2008 | Park ...................... G09G 3/3648 345/55 |
| 2012/0169580 A1* | 7/2012 | Nishi ................... G09G 3/3614 345/98 |
| 2013/0002621 A1* | 1/2013 | Chen ................... G09G 3/3685 345/204 |
| 2015/0035741 A1 | 2/2015 | Lee et al. |
| 2015/0138479 A1 | 5/2015 | Lee et al. |

FOREIGN PATENT DOCUMENTS

| KR | 10-2011-0067448 A | 6/2011 |
| KR | 10-2014-0118222 A | 10/2014 |
| KR | 10-2014-0122960 A | 10/2014 |

* cited by examiner

*Primary Examiner* — Kwang-Su Yang
(74) *Attorney, Agent, or Firm* — Innovation Counsel LLP

(57) ABSTRACT

A display device may include the following elements: a plurality of gate lines extending in a first direction; a plurality of data lines extending in a second direction; a gate driver configured for applying gate signals to the gate lines; a data driver configured for applying data voltages to the data lines; a plurality of pixels electrically connected to the plurality of gate lines and the plurality of data lines; and a control wire set that traverses overlaps an area of a first pixel of the plurality of pixels, electrically interconnects the gate driver and the data driver, and is configured to transmit a control signal from the data driver to the gate driver.

20 Claims, 7 Drawing Sheets

DISPLAY DEVICE INCLUDING CONTROL WIRE

CROSS-REFERENCE TO RELATED APPLICATION

This application claims priority to and the benefit of Korean Patent Application No. 10-2015-0106057 filed in the Korean Intellectual Property Office on Jul. 27, 2015; the entire contents of the Korean Patent Application are incorporated herein by reference.

BACKGROUND (a) Field

The technical field relates to a display device.

(b) Description of the Related Art

Currently, various display devices, such as liquid crystal displays, field emission displays, plasma display panels, and organic light emitting diode displays, are commercially available.

Minimizing a bezel around a display area of a display device may desirably minimize the size of the display device. Nevertheless, since various wires for driving the display device are disposed in the bezel, there is a limit in minimizing the bezel.

The above information disclosed in this Background section is for enhancing understanding of the background of the disclosure. The Background section may contain information that does not form the prior art that is already known in this country to a person of ordinary skill in the art.

SUMMARY

Embodiments may be related to a display device with a minimized bezel.

An embodiment may be related to a display device. The display device may include the following elements: a plurality of gate lines extending in a first direction; a plurality of data lines extending in a second direction; a gate driver configured for applying gate signals to the gate lines; a data driver configured for applying data voltages to the data lines; a plurality of pixels electrically connected to the plurality of gate lines and the plurality of data lines; and a control wire set that traverses (and/or overlaps) an area of a first pixel of the plurality of pixels, electrically interconnects the gate driver and the data driver, and is configured to transmit a control signal from the data driver to the gate driver.

The control wire set may include a first control wire and a second control wire. The first control wire extends in the first direction and is electrically connected between the gate driver and the second control wire. The second control wire extends in the second direction and is electrically connected between the data driver and the first control wire.

The first control wire may be disposed on the same layer as the plurality of gate lines.

The first control wire may be made of the same material as the plurality of gate lines.

The second control wire may be disposed on the same layer as the plurality of data lines, and the first control wire and the second control wire may be interconnected through a first contact hole.

The second control wire may be made of the same material as the plurality of data lines.

The control signal may include at least one of a frame start signal and a clock signal for controlling operation of the gate driver.

The display device may further include the following elements: a power wire set connected to the plurality of pixels; and a power-connecting wire set that traverses (and/or overlaps) an area of a second pixel of the plurality of pixels, electrically interconnect the data driver and the power wire set, and is configured to transmit a power voltage from the data driver to the power wire.

The power-connecting wire set may include a first power-connecting wire and a second power-connecting wire. The first power-connecting wire extends in the first direction and is electrically connected between the power wire set and the second power-connecting wire. The second power-connecting wire extends in the second direction and is electrically connected between the data driver and the first power-connecting wire.

The first power-connecting wire and the second power-connecting wire may be disposed on different layers, and the first power-connecting wire and the second power-connecting wire may be interconnected through a second contact hole.

The power voltage may include at least one of the common voltage and the storage voltage that are applied to the plurality of pixels.

The display device may further include a substrate including a display area in which the plurality of pixels are disposed and a non-display area abutting the display area, wherein portions of the non-display area may be folded to a rear surface of the display area along a first folding line and a second folding line of the second direction and along a third folding line of the first direction.

A portion of the non-display area opposite the data driver with reference to the display area may be cut along a cutting line of the first direction.

A portion of the non-display area that is defined by the first folding line and the third folding line may be cut, and a portion of the non-display area that is defined by the second folding line and the third folding line may be cut.

The first pixel may include the following elements: a thin film transistor connected to one of data lines; and a pixel electrode connected to the thin film transistor, wherein the pixel electrode may include a horizontal stem, a vertical stem, and a plurality of minute branches connected to the horizontal stem and the vertical stem.

The control wire set may include a first control wire overlapping the horizontal stem and may include a second control wire overlapping the vertical stem.

The first control wire and the second control wire may overlap each other in a position at which geometric extensions of the horizontal stem and the vertical stem of the pixel electrode meet.

The pixel electrode of the first pixel may have an opening, which corresponds to the position where the first control wire and the second control wire overlap. The first control wire and the second control wire may be connected through the first contact hole at the position.

The first pixel may include a microcavity that is disposed on the pixel electrode and contains a liquid crystal layer.

A data line of data lines may include two straight portions and a bent portion connected between the two straight portions. The bent portion may correspond to a middle region of the pixel area of the first pixel. The first control wire may overlap (and cross) the bent portion. The second control wire may have a bent structure. A first section of the second control wire may extend substantially perpendicular to the first control wire. A second section of the second control wire may extend substantially parallel to at least one of the two straight portions and may be slanted with respect to the first section of the second control wire.

According to embodiments, it is possible to effectively minimize a bezel (or non-display area) around a display area of a display device. According to embodiments, in a display device, stress applied to a control wire set and stress exerted on a power-connecting wire set may be substantially small, such that satisfactory reliability and durability of the wire sets may be substantially maintained.

DETAILED DESCRIPTION

Figure 1:
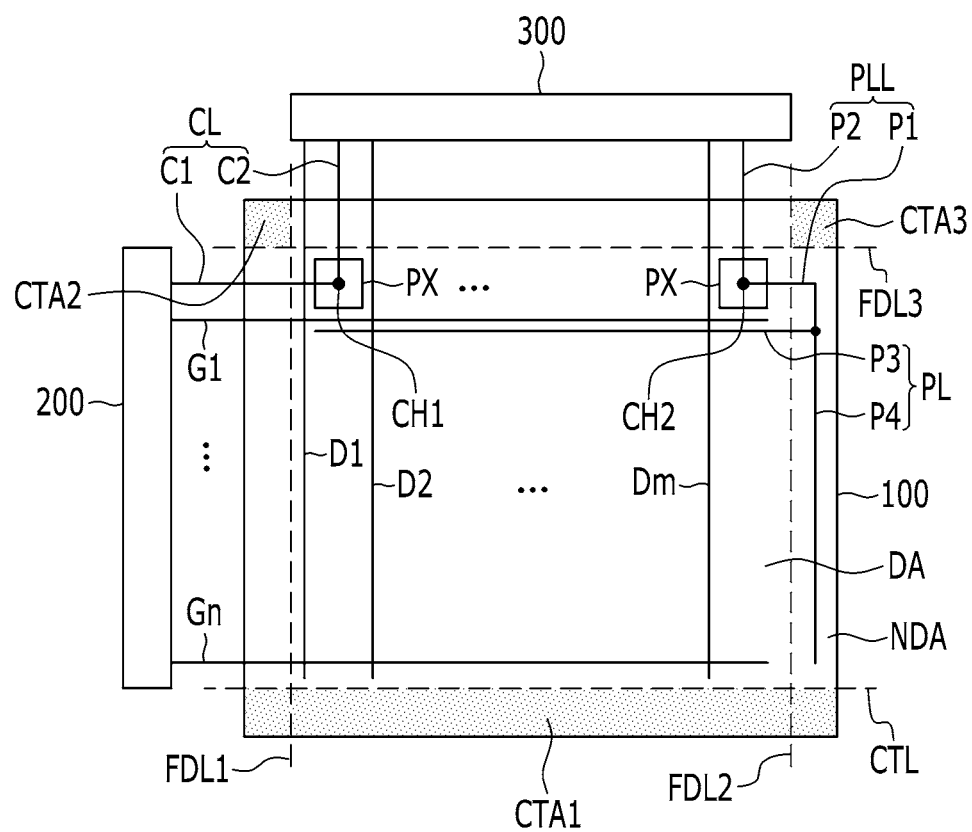
FIG. 1 illustrates a schematic block diagram of a display device according to an embodiment.

Some embodiments are described with reference to the accompanying drawings. As those skilled in the art would realize, the described embodiments may be modified in various ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

Like reference numerals may designate like element throughout the specification.

In this application, if a first element is described as "coupled" or "connected" to a second element, the first element may be "directly coupled" or "directly connected" to the second element or may be "electrically coupled" or "electrically connected" to the second element through a third element. Unless explicitly described to the contrary, the word "comprise" and variations, such as "comprises" or "comprising", may imply the inclusion of stated elements but not the exclusion of any other elements.

FIG. 1 illustrates a schematic block diagram of a display device according to an embodiment.

Referring to FIG. 1, a display device includes a display unit 100, a gate driver 200, and data driver 300.

The display unit 100 includes a display area DA and a non-display area NDA. The display area DA is an area in which a plurality of pixels PX are disposed to display images, and the non-display area NDA includes no pixels and abuts the display area DA. Each of the plurality of pixels PX may display one of primary colors. The primary colors may include three primary colors such as red, green, and blue, and desired colors may be displayed by a spatial sum or a temporal sum of the three primary colors. The primary colors may include yellow, cyan, and magenta. The plurality of pixels may display an image of light of a mixture of primary colors or light of a white color.

The display unit 100 includes pixels PX that are substantially arranged in a matrix form (or array), gate lines (G1 to Gn) that substantially extend in a row direction or a first direction and extend substantially parallel to each other, and data lines (D1 to Dm) that substantially extend in a column direction or a second direction and extend substantially parallel to each other. The display device includes a power wire set PL (or power wire PL) for supplying a power voltage (e.g., a common voltage and/or a storage voltage) to (e.g., a common electrode and/or storage electrode lines of) the plurality of pixels PX. The power wire PL includes first-type power wires P3 (or first power wires P3) that extend in the first direction and substantially parallel to each other and includes a second-type power wire P4 (or second power wire P4) that extends in the second direction to electrically interconnect the first power wires P3. The second power wire P4 may be connected to the first power wires P3 in the non-display area NDA.

The gate driver 200 is connected to the plurality of gate lines (G1 to Gn), and applies gate signal, each of which is a combination of a gate-on voltage and a gate-off voltage, to the plurality of gate lines (G1 to Gn). The gate driver 200 sequentially applies the gate signals to the gate lines (G1 to Gn).

The data driver 300 is connected to the plurality of data lines (D1 to Dm) and applies data voltages to the data lines (D1 to Dm). The data driver 300 may apply data voltages within a predetermined voltage range to the data lines (D1 to Dm) corresponding to the gate signals.

The gate driver 200 and the data driver 300 are interconnected by a control wire-set CL (or control wire CL). The control wire CL traverses (and/or overlaps) an area of at least one of the plurality of pixels PX to electrically interconnect the gate driver 200 and the data driver 300. The data driver 300 transmits a control signal to the gate driver 200 through the control wire CL. One pixel area is an area that one pixel PX occupies, and it may include a light-transmitting region through which the light transmits and a light-blocking region with lower transmittance than the light-transmitting region. Some of the signal lines connected to the pixels PX and thin film transistors may be disposed in the light-blocking region. A control signal transmitted to the gate driver 200 from the data driver 300 may include a frame start signal, a clock signal, and the like for driving the gate driver 200.

The control wire CL includes a first control wire C1 that extends in the first direction and is connected to the gate driver 200, and a second control wire C2 that extends in the second direction and is connected to the data driver 300.

In a manufacturing process of the display device, when the plurality of gate lines (G1 to Gn) are formed, the first control wire C1 may be simultaneously formed, and the first control wire C1 may be made of the same material as that of the plurality of gate lines (G1 to Gn). When the plurality of data lines (D1 to Dm) are formed, the second control wire C2 may be simultaneously formed, and the second control wire C2 may be made of the same material as that of the plurality of data lines (D1 to Dm). The plurality of gate lines (G1 to Gn) and the plurality of data lines (D1 to Dm) may be respectively formed on different layers with an insulating layer therebetween. Accordingly, a short circuit may not occur at points at which the plurality of gate lines (G1 to Gn) and the plurality of data lines (D1 to Dm) cross.

For example, the first control wire C1 is disposed on the layer on which the plurality of gate lines (G1 to Gn) are disposed, and the second control wire C2 is disposed on the layer on which the plurality of data lines (D1 to Dm) are disposed, and thus the first control wire C1 and the second control wire C2 may be disposed on different layers. The first control wire C1 and the second control wire C2 may be overlapped in one pixel area, and they may be connected to each other through a first contact hole CH1 formed in the overlapped portion. A connection configuration between the first control wire C1 and the second control wire C2 will be described in detail later.

The data driver 300 and the power wire PL are interconnected by a power-connecting wire set PLL (or power-connecting wire PLL). The power-connecting wire PLL traverses (or overlaps) an area of at least another of the plurality of pixels PX to electrically interconnect the data driver 300 and the power wire PL. The data driver 300 transmits a power voltage to the power wire PL through the power-connecting wire PLL. The power voltage may include a common voltage, a storage voltage, and the like that are applied to the plurality of pixels PX.

The power-connecting wire PLL includes a first power-connecting wire P1 that extends in the first direction to be connected to the power wire PL and a second power-connecting wire P2 that extends in the second direction to be connected to the data driver 300.

In the manufacturing process of the display device, when the plurality of gate lines (G1 to Gn) are formed, the first power-connecting wire P1 may be simultaneously formed, and the first power-connecting P1 may be made of the same material as that of the plurality of gate lines (G1 to Gn). When the plurality of data lines (D1 to Dm) are formed, the second power-connecting wire P2 may be simultaneously formed, and the second power-connecting wire P2 may be made of the same material as that of the plurality of data lines (D1 to Dm).

For example, the first power-connecting P1 is disposed on the layer on which the plurality of gate lines (G1 to Gn) are disposed, and the second power-connecting wire P2 is disposed on the layer on which the plurality of data lines (D1 to Dm) are disposed, and thus the first power-connecting P1 and the second power-connecting wire P2 may be disposed on different layers. The first power-connecting wire P1 and the second power-connecting wire P2 may be overlapped in one pixel area, and they may be connected to each other through a first contact hole CH2 formed in the overlapped portion.

In an embodiment, the display device may include a plurality of control wires CL and a plurality of power-connecting wire PLL. The control wires CL may traverse pixel areas that do not overlapped each other and may interconnect the gate driver 200 and the data driver 300. The power-connecting wires PLL may traverse pixel areas that do not overlapped with each other and may interconnect the data driver 300 and the power wire PL.

The display unit 100 may include a substrate on which the plurality of pixels PX and the plurality of wires (G1 to Gn, D1 to Dm, and PL) are disposed, and the substrate may be made of a flexible material such plastic and the like. The substrate may be divided into a display area DA, in which the pixels PX are disposed, and a non-display area NDA, which is the remaining area with no pixels.

A portion of the non-display area NDA of the substrate that overlaps the second control wire C2 and/or the second power-connecting wire P2 (and corresponds to the side in which the data driver 300 is disposed) and/or the opposite portion of the non-display area NDA may be cut along a cutting line CTL of the first direction. A portion that is cut along the cutting line CTL is referred to a first cutting area CTA1 The cutting line CTL may be very closely set at a boundary line between the display area DA and the non-display area NDA, and the portion of the non-display area NDA opposite the data driver 300 may be removed by precisely cutting based on the cutting line CTL.

Portions of the non-display area NDA of the substrate positioned at the left and right sides of the display area DA may be folded to a rear surface of the display area DA along a first folding line FDL1 and a second folding line FDL2 of the second direction. A portion of the non-display area NDA of the substrate that overlaps the second wire C2 and/or the second power-connecting wire P2 may be folded to the rear surface of the display area DA along a third folding line FDL3 of the first direction. The first to third folding lines FDL1, FDL2, and FDL3 may be very closely set at the boundary line between the display area DA and the non-display area NDA, and thus the non-display area NDA is substantially hidden from a viewer of the display device.

Given the folding along the third folding line FDL3, the data driver 300 may overlap some pixels in a direction perpendicular the substrate (i.e., a direction perpendicular to the plan view of the display device), the second control wire C2 may include two sections that overlap each other in the direction perpendicular to the substrate, a first section of the second control wire C2 may be positioned between a pixel electrode and a second section of the second control wire C2 in the direction perpendicular to the substrate, the second power-connecting wire P2 may include two sections that overlap each other in the direction perpendicular to the substrate, and/or a first section of the second power-connecting wire P2 may be positioned between a pixel electrode and a second section of the second power-connecting wire P2 in the direction perpendicular to the substrate.

Given the folding along the first folding line FDL1, the gate driver 200 may overlap some pixels in the direction perpendicular the substrate, the first control wire C1 may include two sections that overlap each other in the direction perpendicular to the substrate, a first section of the first control wire C1 may be positioned between the pixel electrode and a second section of the first control wire C1 in the direction perpendicular to the substrate, and/or the each gate line may include two sections that overlap each other in the direction perpendicular to the substrate.

Given the folding along the second folding line FDL2, the first power-connecting wire P1 may include two sections that overlap each other in the direction perpendicular to the substrate, a first section of the first power-connecting wire P1 may be positioned between a pixel electrode and a second section of the first power-connecting wire P1 in the direction perpendicular to the substrate, each first power wire P3 may include two sections that overlap each other in the direction perpendicular to the substrate, a first section of a first power wire P3 may be positioned between a pixel electrode and a second section of the first power wire P3 in the direction perpendicular to the substrate, a third section of the first power wire P3 may be positioned between a common electrode and the second power wire P4 in the direction perpendicular to the substrate, and/or the second power wire P4 may overlap a plurality of pixel electrodes in the direction perpendicular to the substrate.

A second cutting area CTA2 of the non-display area NDA of the substrate may be defined by the first folding line FDL1 and the third folding line FDL3. A third cutting area CTA3 may be defined by the second folding line FDL2 and the third folding line FDL3 occur. The second cutting area CTA2 may be cut along the first folding line FDL1 and the third folding line FDL3 and removed. The third cutting area CTA3 may be cut along the second folding line FDL2 and the third folding line FDL3 and removed. The substrate may be easily folded along the first to third folding lines FDL1, FDL2, and FDL3 after the second cutting area CTA2 and the third cutting area CTA3 have been removed.

As described above, the non-display area NDA is cut and/or folded to the rear surface of the display area DA. Advantageously, the bezel of the display device may be minimized.

If the control wire CL and the power-connecting wire PLL do not traverse the pixel area to be disposed, the control wire CL and the power-connecting wire PLL should be disposed in the non-display area NDA. For example, the control wire CL and the power-connecting wire PLL may be disposed in the second cutting area CTA2 and the third cutting area CTA3. In this case, since the second cutting area CTA2 and the third cutting area CTA3 are not removed, it is difficult to fold the substrate along the first to third folding lines FDL1, FDL2, and FDL3. Further, since the second cutting area CTA2 and the third cutting area CTA3 are double-folded, the control wire CL and the power-connecting wire PLL disposed in the second cutting area CTA2 and the third cutting area CTA3 are greatly stressed, such that damage or a short circuit may occur. In an embodiment, the area CTA1 of the non-display area NDA of the substrate may not be cut and may be folded to the rear surface of the display area DA.

Figure 2:
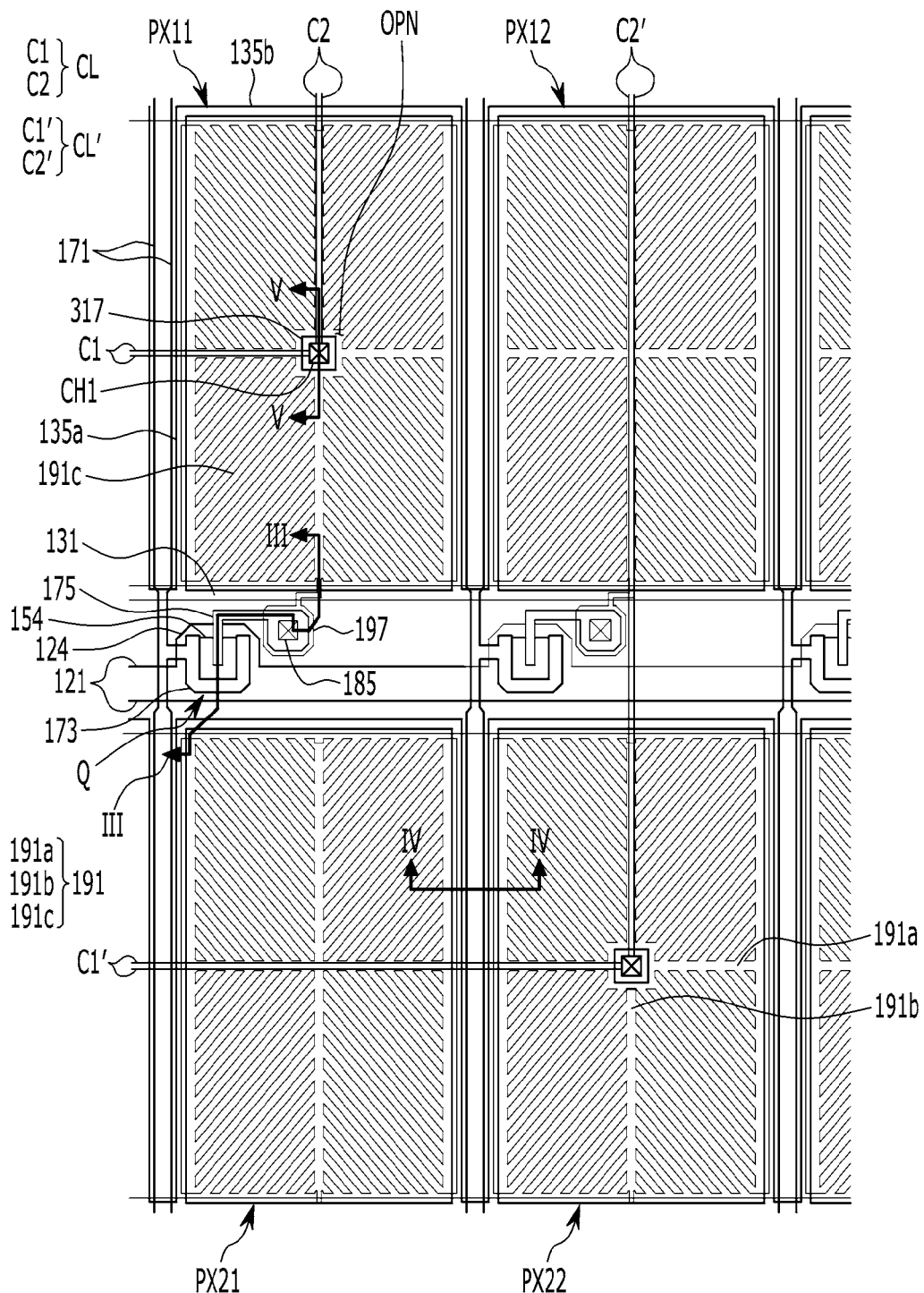
FIG. 2 is a top plan view illustrating a position of a control wire of a display device according to an embodiment.
Figure 3:
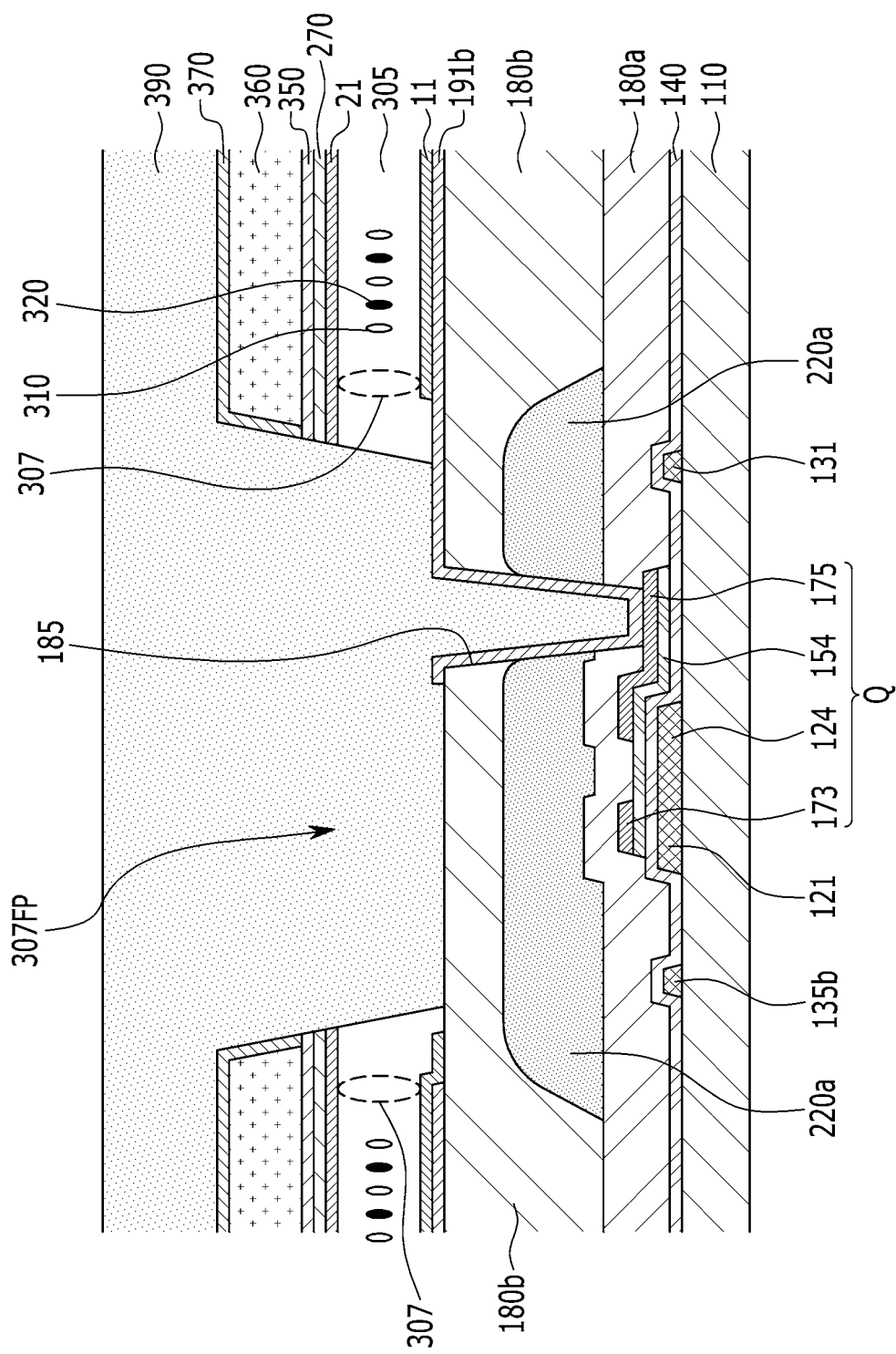
FIG. 3 illustrates a cross-sectional view taken along line of FIG. 2.
Figure 4:
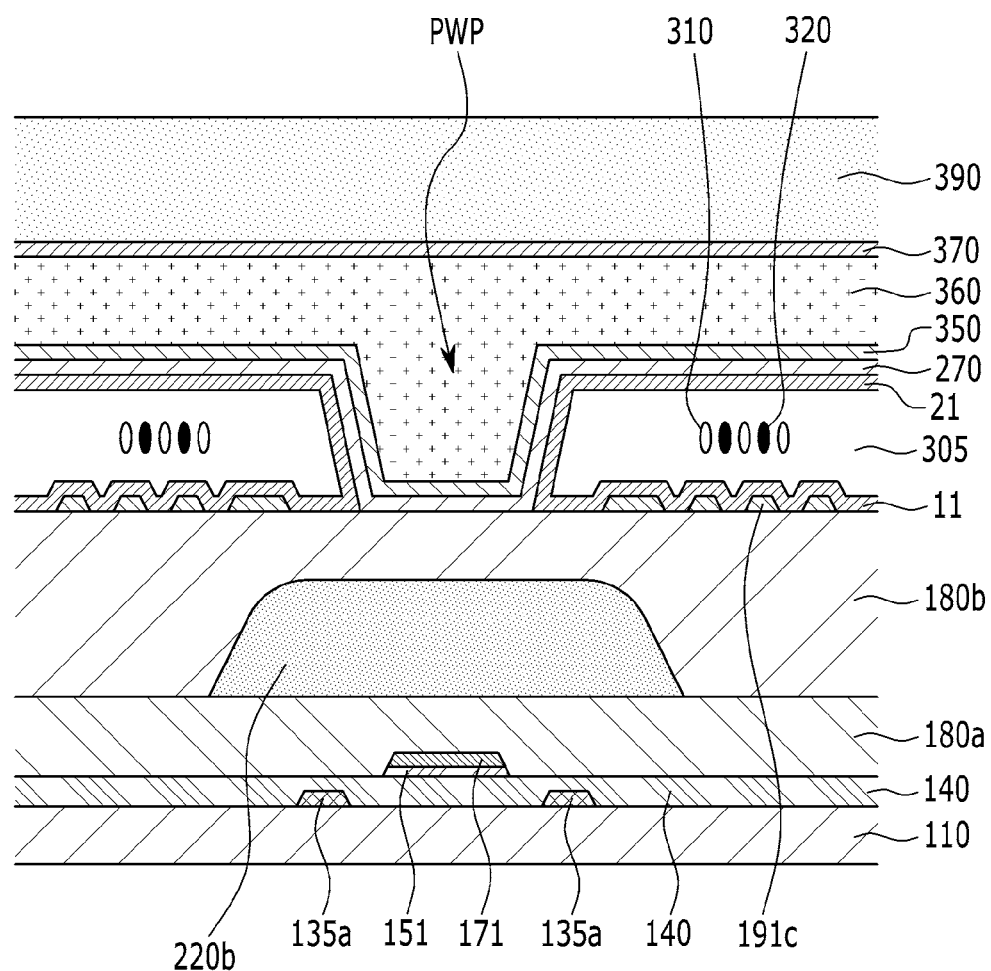
FIG. 4 illustrates a cross-sectional view taken along line IV-IV of FIG. 2.
Figure 5:
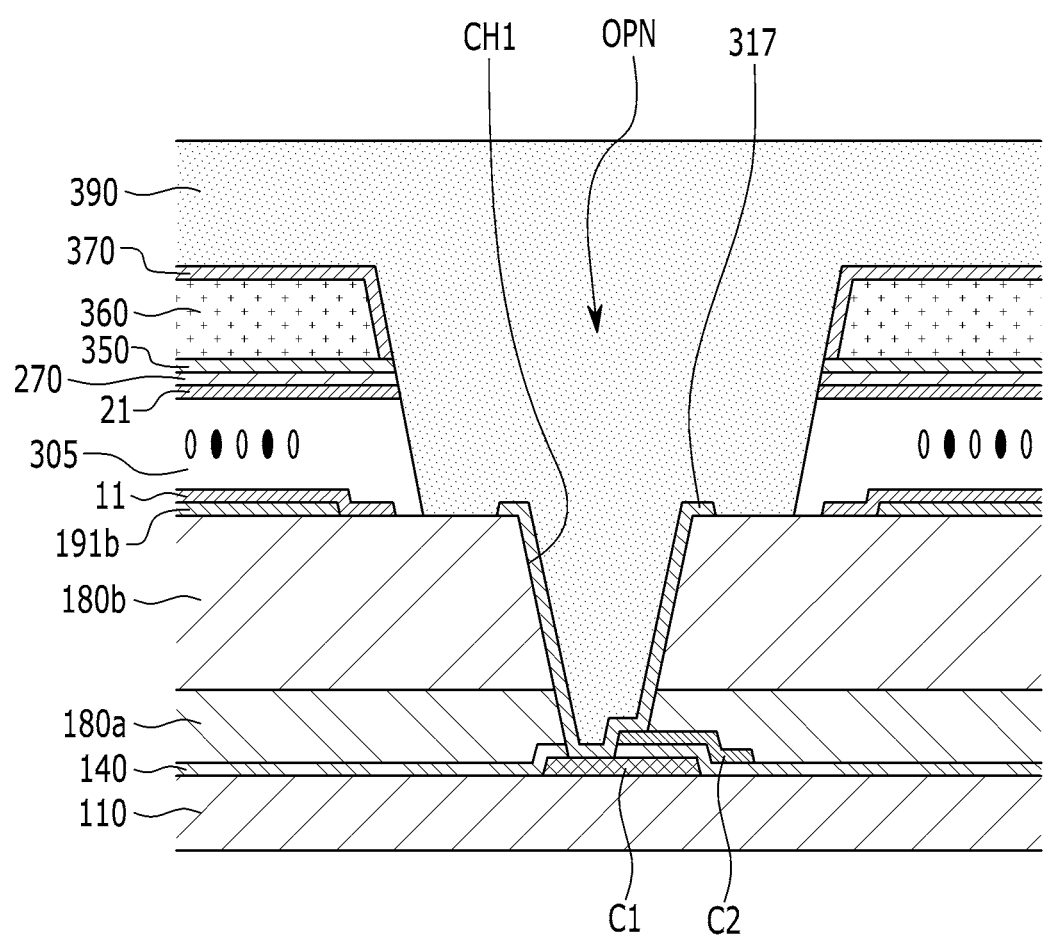
FIG. 5 illustrates a cross-sectional view taken along line V-V of FIG. 2.

FIG. 2 is a top plan view of illustrating a position of a control wire of a display device according to an embodiment. FIG. 3 illustrates a cross-sectional view taken along line of FIG. 2. FIG. 4 illustrates a cross-sectional view taken along line IV-IV of FIG. 2. FIG. 5 illustrates a cross-sectional view taken along line V-V of FIG. 2.

First, referring to FIGS. 2 to 4, a gate conductor including a gate line 121 and a storage electrode line 131 is formed on a first substrate 110 made of a transparent and flexible insulating material such as plastic and the like. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc. However, the gate line 121 may have a multilayer structure in which at least two conductive layers having different physical properties are included.

The gate line 121 mainly extends in a horizontal direction (first direction) and transmits a gate signal. The gate line 121 includes a gate electrode 124 protruded therefrom. The protruded shape of the gate electrode 124 may be modified.

The storage electrode line 131 mainly extends in the horizontal direction (first direction) and transmits a predetermined voltage such as the common voltage or storage voltage. The storage electrode line 131 includes a pair of vertical portions 135a extending substantially perpendicular to the gate line 121, and a horizontal portion 135b for interconnecting ends of the pair of vertical portions 135a. The vertical and horizontal portions 135a and 135b of the storage electrode line 131 may substantially surround a pixel electrode 191.

A gate insulating layer 140 is formed on the gate line 121 and the storage electrode line 131. The gate insulating layer 140 may be made of an inorganic insulating material such as a silicon nitride (SiNx) or a silicon oxide (SiOx). The gate insulating layer 140 may be formed as a single layer or a multilayer.

Semiconductor layers 151 and 154 are formed on the gate insulating layer 140. The semiconductor layer 151 is disposed below a data line 171. The semiconductor layer 154 is disposed below a source electrode 173 and a drain electrode 175 and in a channel area of a thin film transistor Q. The semiconductor layers 151 and 154 may be made of amorphous silicon, polycrystalline silicon, or a metal oxide.

Ohmic contacts (not shown) may be formed between the semiconductor layers 151 and 154, the data line 171, the source electrode 173, and the drain electrode 175. The ohmic contacts may be made of a material such as a silicide or n+ hydrogenated amorphous silicon to which a highly concentrated n-type impurity is doped.

Data conductors including the data line 171 connected to the source electrode 173, the drain electrode 175, and the source electrode 173 are formed on the semiconductor layers 151 and 154 and the gate insulating layer 140.

The data line 171 and the drain electrode 175 may be preferably made of a refractory metal such as molybdenum, chromium, tantalum, titanium, etc., or an alloy thereof, and may have a multilayer structure in which a refractory metal layer (not shown) and a low resistance conductive layer (not shown) are included. Examples of the multilayer structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer.

The data line 171 transmits the data signal and mainly extends in the vertical direction (second direction) to cross the gate line 121. The source electrode 173 and the drain electrode 175 form the thin film transistor Q together with the gate electrode 124 and the semiconductor layer 154, and the channel of the thin film transistor Q is formed in the semiconductor layer 154 between the source electrode 173 and the drain electrode 175.

A first interlayer insulating layer 180a is formed on the data conductors 171, 173, and 175 and the exposed semiconductor layer 154. The first interlayer insulating layer 180a may include an inorganic insulating material such as a silicon nitride (SiNx) and a silicon oxide (SiOx), or an organic insulating material.

A light blocking member 220 is formed on the first interlayer insulating layer 180a. The light blocking member 220 is formed in a lattice structure having an opening corresponding to an area displaying an image, and is formed of a material through which light does not transmit. The light blocking member 220 includes a horizontal light blocking member 220a formed along a direction parallel to the gate line 121 and a vertical light blocking member 220b formed along a direction parallel to the data line 171. In some embodiments, the light blocking member 220 may be formed on an upper insulating layer 370 which will be described later.

A second interlayer insulating layer 180b is formed on the light blocking member 220 to cover it. The second interlayer insulating layer 180b may include an inorganic insulating material such as a silicon nitride (SiNx) and a silicon oxide (SiOx), or an organic insulating material. As shown in FIGS. 3 and 4, when a step occurs due to a thickness of the light blocking member 220, it is possible to reduce or remove the step by containing an organic insulating material in the second interlayer insulating layer 180b.

A contact hole 185 exposing the drain electrode 175 is formed in the light blocking member 220 and the interlayer insulating layers 180a and 180b.

A pixel electrode 191 is formed on the second interlayer insulating layer 180b. The pixel electrode 191 may be made of a transparent conductive material such as indium tin oxide (ITO) or indium zinc oxide (IZO).

The pixel electrode 191 may have an overall quadrangular shape. The pixel electrode 191 includes a cross-shaped stem including a horizontal stem 191a and a vertical stem 191b crossing the horizontal stem 191a. The pixel electrode is divided into four sub-areas by the horizontal stem 191a and the vertical stem 191b, and each of the four sub-areas includes a plurality of minute branches 191c connected to the cross-shaped stem. In the present embodiment, an outer stem surrounding the outside of the pixel electrode 191 may be further included.

The minute branches 191c of the pixel electrode 191 may form an angle of about 40 to 45 degrees with respect to the gate line 121 or the horizontal stem. The minute branches of two adjacent sub-areas may be perpendicular to each other. Widths of the minute branches are gradually increased, or distances between the minute branches 191c may be different from each other.

The pixel electrode 191 is connected to the vertical stem 191b, and includes an extension 197 having a wider area than the vertical stem 191b. The pixel electrode 191 is physically and electrically connected to the drain electrode 175 through the contact hole 185 in the extension 197, and receives a data voltage from the drain electrode 175.

The above-described thin film transistor Q and pixel electrode 191 are illustrative, and the structure of the thin film transistor and the design of the pixel electrode may be changed in different embodiments.

A lower alignment layer 11 is formed on the pixel electrode 191. An upper alignment layer 21 is formed below a common electrode 270 to face the lower alignment layer 11.

The lower alignment layer 11 and the upper alignment layer 21 may be vertical alignment layers. The alignment layers 11 and 21 may be formed to include at least one of generally-used materials as a liquid crystal alignment layer such as polyamic acid, polysiloxane, or polyimide.

A microcavity 305 is formed between the lower alignment layer 11 and the upper alignment layer 21. The microcavity 305 may be formed in one pixel area, or may be formed across two adjacent pixel areas. A liquid crystal layer is formed inside the microcavity 305.

The liquid crystal layer includes a liquid crystal material containing liquid crystal molecules 310. The liquid crystal layer may further include dichroic dyes 320 mixed with the liquid crystal material. The dichroic dye is a guest that is mixed in the liquid crystal material that is a host, and hereinafter a material of which the dichroic dye is mixed with the liquid crystal material is referred to as a host-guest liquid crystal material. A color represented by the dichroic dye is determined by a spectrum that is not absorbed by the dichroic dye, that is, a complementary color. Accordingly, when any pixel is intended to display one of primary colors such as red, green, and blue, the dichroic dye included in the liquid crystal layer of the corresponding pixel may be a material absorbing light of a wavelength region corresponding to one of cyan, magenta, and yellow. For example, each liquid crystal layer of a red pixel, a green pixel, and a blue pixel may include the host-guest liquid crystal material of which a cyan dichroic dye, a magenta dichroic dye, and a yellow dichroic dye are respectively mixed with the liquid crystal material. Here, cyan may be defined by an absorption wavelength region of about 600 to 700 nm, magenta may be defined by the absorption wavelength region of about 500 to 580 nm, and yellow may be defined by the absorption wavelength region of about 430 to 490 nm.

According to an embodiment, the color of the pixel is realized by the dichroic dye included in the liquid crystal layer, such that a color filter is not separately required. In some embodiments, a color filter may be formed below or on the microcavity 305 so that a color of a pixel may be realized.

On the other hand, when any pixel displays one of cyan, magenta, and yellow, the dichroic dye included in the liquid crystal layer of the corresponding pixel may be a material absorbing the wavelength region corresponding to one of red, green, and blue.

The dichroic dye may include one or more of azo dyes, anthraquinone dyes, perylene dyes, merocyanine dyes, azomethine dyes, phthaloperylene dyes, indigo dyes, dioxadine dyes, polythiophene dyes, and phenoxazine dyes.

An appropriate concentration at which the dichroic dye is mixed with the liquid crystal material may be different according to an absorption capacity of the dichroic dye. For example, the dichroic dye may be mixed with the liquid crystal material at a concentration of about 0.1 to about 15 wt %.

The microcavity 305 has an injection hole 307 to inject a host-guest material for forming the liquid crystal layer.

The microcavity 305 may be formed in a column direction, that is, a vertical direction, of the pixel electrode 191. In an embodiment, the alignment material forming the alignment layers 11 and 21 and the host-guest liquid crystal material including the liquid crystal molecules 310 and the dichroic dye 320 may be injected into the microcavity 305 using capillary force.

The microcavity 305 is divided in a vertical direction by a plurality of injection hole forming regions 307FP positioned at a portion overlapping the gate line 121, and a plurality of microcavities 305 may be formed along the direction in which the gate line 121 extends.

A common electrode 270 and a lower insulating layer 350 are disposed on the upper alignment layer 21. The common electrode 270 receives the common voltage, and generates an electric field together with the pixel electrode 191 to which the data voltage is applied to determine a direction in which the liquid crystal molecules 310 positioned at the microcavity 305 between the two electrodes are inclined. The dichroic dye tends to be arranged like the movement of the liquid crystal molecules. The common electrode 270 forms a capacitor with the pixel electrode 191 to maintain the received voltage even after the thin film transistor is turned off. The lower insulating layer 350 may be formed of a silicon nitride (SiNx) or a silicon oxide (SiOx).

In the present embodiment, it is described that the common electrode 270 is formed on the microcavity 305, but in an embodiment, the common electrode 270 may be formed below the microcavity 305, such that liquid crystal driving according to a coplanar electrode (CE) mode may be possible.

A roof layer 360 is positioned on the lower insulating layer 350. The roof layer 360 serves as a support so that the microcavity 305, which is a space between the pixel electrode 191 and the common electrode 270, may be formed. The roof layer 360 may include a photoresist, or other organic materials.

The upper insulating layer 370 is disposed on the roof layer 360. The upper insulating layer 370 may contact an upper surface of the roof layer 360. The upper insulating layer 370 may be formed of the inorganic insulating material such as a silicon nitride (SiNx) or a silicon oxide (SiOx). The upper insulating layer 370 serves to protect the roof layer 360 that is made of the organic material, and if necessary, it may be omitted.

A capping layer 390 fills the liquid crystal injection hole formation region 307FP and covers the liquid crystal injection hole 307 of the microcavity 305 exposed by the liquid crystal injection hole formation region 307FP. The capping layer 390 contacts the liquid crystal molecules 310 such that it may be made of a material that does not react with the liquid crystal molecules 310, such as parylene.

The capping layer 390 may be formed as a multilayer such as a dual layer or a triple layer. The dual layer is formed of two layers that are made of different materials. The triple layer is formed of three layers, and materials of adjacent layers are different from each other. For example, the capping layer 390 may include a layer made of the organic insulating material and a layer made of the inorganic insulating material.

Although not illustrated, a polarizer may be further formed on upper and lower surfaces of the display device. The polarizer may include a first polarizer and a second polarizer. The first polarizer may be attached to a lower surface of the first substrate 110 and the second polarizer may be attached on the capping layer 390.

As shown in FIG. 4, a partition wall PWP is formed between the microcavities 305 adjacent to each other in the horizontal direction. The partition wall formation portion PWP may be formed in an extending direction of the data line 171, and may be covered by the roof layer 360. The lower insulating layer 350, the common electrode 270, the upper insulating layer 370, and the roof layer 360 are filled in the partition wall formation portion PWP, and the structure forms the partition wall to partition or define the microcavity 305. If the partition wall structure such as the partition wall formation portion PWP exists between the microcavities 305, even though the first substrate 110 is bent, generated stress is small, and a change degree of a cell gap may be considerably reduced.

The configuration of a control wire CL will now be described with reference to FIG. 2 and FIG. 5.

Four adjacent pixel areas (PX11, PX12, PX21, and PX22) are shown in FIG. 2. The pixel areas are disposed in an array that includes a plurality of pixel rows and a plurality of pixel columns.

A control wire set CL (or control wire CL) is disposed across (and/or overlaps) a first pixel area PX11 of the plurality of pixel areas that is positioned at a first pixel row and a first pixel column. The control wire CL includes a first control wire C1 extending in the first direction and a second control wire C2 extending in the second direction.

Further, a control wire set CL' (or control wire CL') is disposed across (and/or overlaps) the second pixel area PX12 positioned at the first pixel row and a second pixel column, the third pixel area PX21 positioned at a second pixel row and the first pixel column, and the fourth pixel area PX22 positioned a second pixel row and the second pixel column. The display device may include a plurality of control wires CL and a plurality of control wires CL', and the control wires CL and the control wires CL' may be disposed at different pixel areas. The control wire CL' includes a first control wire C1' extending in the first direction and a second control wire C2' extending in the second direction. For example, the plurality of control wires CL and CL' are configured in analogous structures, and wires of the control wire CL may extend parallel to wires of the control wire CL'. The control wires CL and CL' may have analogous structures.

The first control wire C1 is disposed to overlap the horizontal stem 191a of the pixel electrode 191 in the first pixel area PX11, and the second control wire C2 is disposed to overlap the vertical stem 191b of the pixel electrode 191 in the first pixel area PX11.

The first control wire C1 and the second control wire C2 overlap in a position at which the horizontal stem 191a and the vertical stem 191b of the pixel electrode 191 meet. The pixel electrode 191 of the first pixel area PX11 has an open portion OPN in an area in which the first control wire C1 and the second control wire C2 overlap and interconnect.

The first contact hole CH1 is formed in the open portion OPN of the pixel electrode 191 so that the first control wire C1 and the second control wire C2 may be connected.

A structure of the open portion OPN will be described with reference to FIG. 5. The first control wire C1 is formed on the first substrate 110, and the gate insulating layer 140 is formed on the first control wire C1. When the gate line 121 is formed, the first control wire C1 and the gate line 121 may be formed in the same layer.

The second control wire C2 is formed on the gate insulating layer 140. In some embodiments, a semiconductor layer (not shown) may be formed below the second control wire C2. When the data line 171 is formed, the second control wire C2 and the data line 171 may be formed in the same layer.

The first interlayer insulating layer 180a and the second interlayer insulating layer 180b are formed on the second control wire C2. The first contact hole CH1 exposing the first control wire C1 and the second control wire C2 is formed in the gate insulating layer 140, the first interlayer insulating layer 180a, and the second interlayer insulating layer 180b.

A connecting electrode 317 connecting the first control wire C1 and the second control wire C2 is formed in the first contact hole CH1. The connecting electrode 317 may be formed when the pixel electrode 191 is formed, and it may be made of the same material as the pixel electrode 191.

The capping layer 390 is disposed on the connecting electrode 317.

Figure 6:
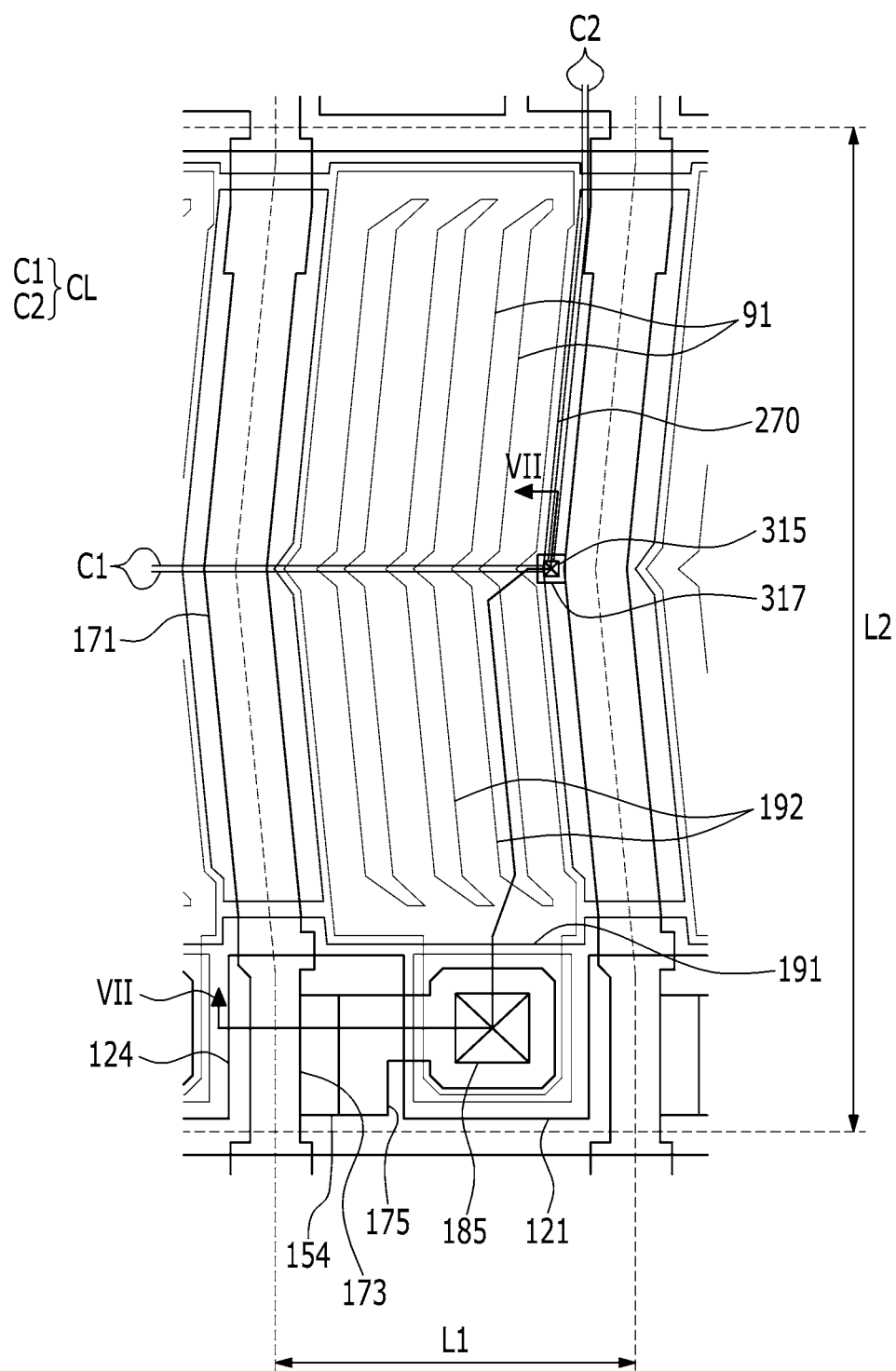
FIG. 6 illustrates a top plan view of a display device according to an embodiment.
Figure 7:
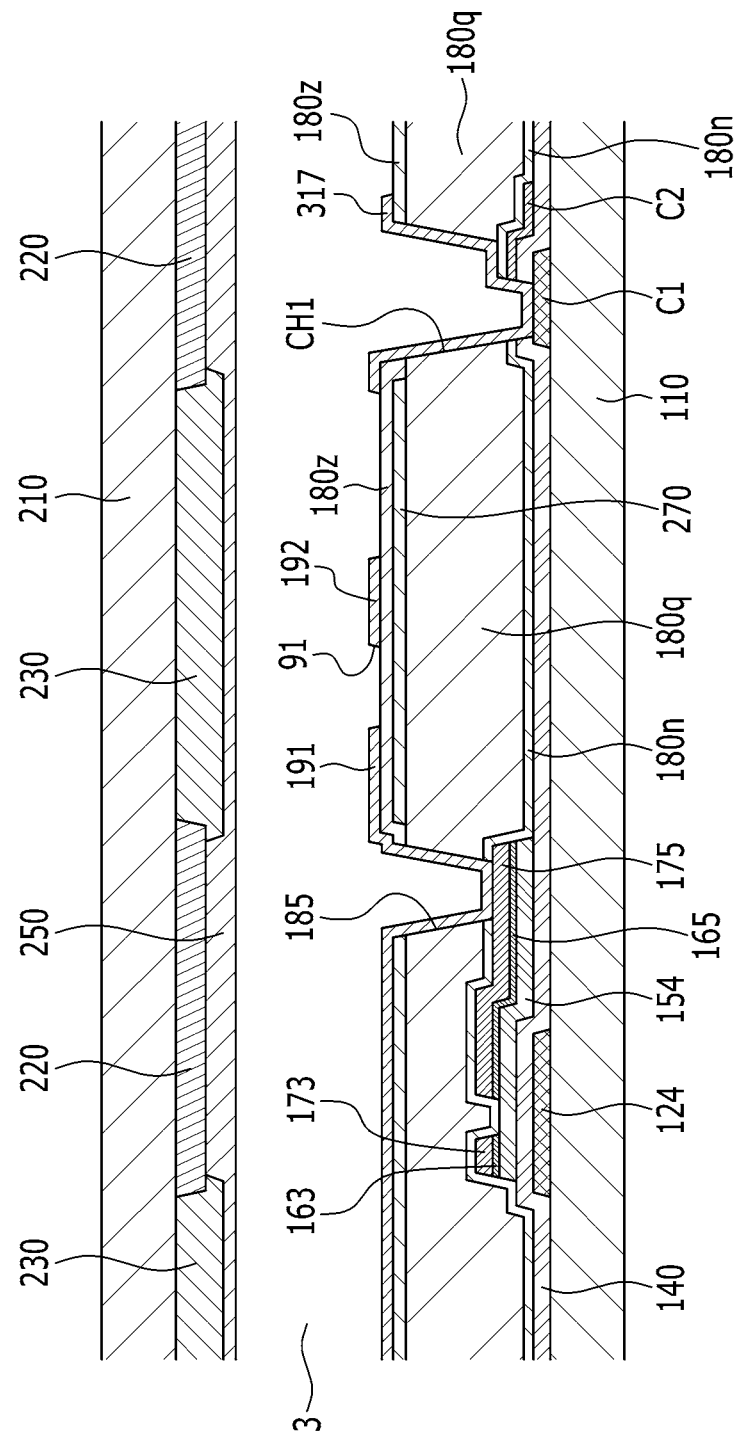
FIG. 7 illustrates a cross-sectional view taken along line VII-VII of FIG. 6.

The power-connecting wire PLL may have structures that are analogous to structures of the control wire CL described with reference to FIGS. 2 and 5. As described above, the first control wire C1 and the second control wire C2 are disposed to overlap the horizontal stem 191a and the vertical stem 191b of the pixel electrode 191, and the open portion OPN of the pixel electrode 191 is disposed in the position at which the horizontal stem 191a and the vertical stem 191b meet, thereby minimizing reduction of luminance due to the control wire CL. This is because a relatively small amount of light is emitted from the horizontal stem 191a and the vertical stem 191b of the pixel electrode 191, compared with the four sub-areas. FIG. 6 illustrates a top plan view of a display device according to an embodiment. FIG. 7 illustrates a cross-sectional view taken along line VII-VII of FIG. 6.

FIG. 6 illustrates one pixel area. Here, a horizontal length L1 of one pixel indicates a distance between two adjacent data lines 171 by which a vertical central region is defined, and a vertical length L2 thereof indicates a distance between two adjacent gate lines 121 by which a horizontal central region is defined.

First, a lower panel will be described.

The first substrate 110 may be made of a transparent and flexible insulating material. The gate conductor including the gate line 121 is formed on the first substrate 110.

The gate insulating layer 140 is formed on the gate line 121.

The semiconductor layer 154 made of amorphous silicon or polysilicon is disposed on the gate insulating layer 140. The semiconductor layer 154 may include an oxide semiconductor.

Ohmic contacts 163 and 165 are formed on the semiconductor layer 154. The ohmic contacts 163 and 165 may be paired to be disposed on the semiconductor layer 154. When the semiconductor layer 154 is an oxide semiconductor, the ohmic contacts 163 and 165 may be omitted.

Data conductors including a data line 171 including a source electrode 173 and a drain electrode 175 are formed on the ohmic contacts 163 and 165 and the gate insulating layer 140.

In an embodiment, the data line 171 may include a first curved portion (or first bent portion) that is curved to facilitate maximum transmittance of the liquid crystal display, and the first curved portion may correspond to a middle region of the pixel area and may have a V-shape. The pixel electrode 192, at the middle region of the pixel area, may include a second curved portion (or second bent portion) having edges that form predetermined angles with respect to edges of the first curved portion.

The source electrode 173 is a portion of the data line 171 and is disposed on the same line as the data line 171. The drain electrode 175 is formed to extend parallel to the source electrode 173. Accordingly, the drain electrode 175 is parallel to the portion of the data line 171.

The gate electrode 124, the source electrode 173, and the drain electrode 175 form one thin film transistor (TFT) together with the semiconductor layer 154, and the channel of the thin film transistor is formed on the semiconductor layer 154 between the source electrode 173 and the drain electrode 175.

By including the source electrode 173 disposed on the same line as the data line 171 and the drain electrode 175 extending in parallel with the data line 171, a width of the thin film transistor may be increased without increasing an area occupied by the data conductor, thereby increasing an aperture ratio of the liquid crystal display.

A first passivation layer 180n is disposed on the data conductors 171, 173, and 175, the gate insulating layer 140, and an exposed portion of the semiconductor layer 154. The first passivation layer 180n may be made of an organic insulating material or an inorganic insulating material.

A second passivation layer 180q is formed on the first passivation layer 180n. The second passivation layer 180q may be made of an organic insulating material.

The second passivation layer 180q may be a color filter. When the second passivation layer 180q is the color filter, the second passivation layer 180q may uniquely display one of the primary colors. When the second passivation layer 180q is the color filter, a color filter 230, which will be described later, may be omitted.

The common electrode 270 is disposed on the second passivation layer 180q. The common electrode 270 having a planar shape may be formed as a plate electrode on the first substrate 110, and includes an opening disposed in a region corresponding to a periphery of the drain electrode 175.

The common electrodes 270 disposed in the adjacent pixels are connected to each other, and may be provided with a constant common voltage that is supplied from the outside.

An insulating layer 180z is formed on the common electrode 270. The insulating layer 180z may be made of an organic insulating material or an inorganic insulating material.

The pixel electrode 191 is disposed on the insulating layer 180z. The pixel electrode 191 includes a curved edge that is substantially parallel to the curved portion of the data line 171. The pixel electrode 191 includes a plurality of cutouts 91 and a plurality of branch electrodes 192 that are disposed between adjacent cutouts 91.

The pixel electrode 191 is a first field generating electrode or a first electrode, and the common electrode 270 is a second field generating electrode or a second electrode. The pixel electrode 191 and the common electrode 270 may form a coplanar electric field.

The contact hole 185 exposing the drain electrode 175 is formed in the first passivation layer 180n, the second passivation layer 180q, and the insulating layer 180z. The pixel electrode 191 is physically and electrically connected to the drain electrode 175 through the contact hole 185 to receive a voltage from the drain electrode 175.

A first alignment layer (not shown) may be formed on the pixel electrode 191 and the insulating layer 180z.

Next, an upper panel will be described.

A second substrate 210 made of a transparent and flexible insulating material such as plastic or the like faces the first substrate 110. A light blocking member 220 is formed on the second substrate 210. The light blocking member 220 is referred to as a black matrix and prevents light leakage.

A plurality of color filters 230 are formed on the second substrate 210. When the second passivation layer 180q is a color filter, the color filters 230 may be omitted.

An overcoat 250 is formed on the color filter 230 and the light blocking member 220. The overcoat 250 may be made of an organic insulating material, and prevents the color filter 230 from being exposed and provides a planarization surface. The overcoat 250 may be omitted.

A second alignment layer may be formed on the overcoat 250.

A liquid crystal layer 3 is disposed between the lower panel and upper panel. The liquid crystal layer 3 may include a liquid crystal material having positive dielectric anisotropy.

The pixel electrode 191 receives the data voltage from the drain electrode 175, and the common electrode 270 receives the common voltage from the power wire PL disposed at the outside of the display area.

As the pixel electrode 191 and the common electrode 270 which are field generating electrodes generate an electric field, liquid crystal molecules 3 of a liquid crystal layer 310 disposed on the two field generating electrodes 191 and 270 rotate in a direction parallel to the generated electric field. Depending on the rotating direction of the liquid crystal molecules determined as described above, polarization of light transmitted through the liquid crystal layer is changed.

As such, transmittance of the liquid crystal display may increase and a wide viewing angle may be realized by forming the two field generating electrodes 191 and 270 on one lower panel.

According to an embodiment, the common electrode 270 has the flat planar shape and the pixel electrode 191 has the plurality of branch electrodes. According to an embodiment, the pixel electrode 191 may have a flat planar shape and the common electrode 270 may have a plurality of branch electrodes.

Next, the configuration of the control wire CL will be described.

The control wire CL includes the first control wire C1 extending in the first direction and the second control wire C2 extending along the data line 171. The second control wire C2 is disposed between the pixel electrode 191 and a data line 171. The second control wire C2 has a curved (or bent) structure. A first section of the second control wire C2 may extend substantially perpendicular to the first control wire C1. A second section of the second control wire C2 may extend along the data line 171 and may extend slanted with respect to the first section of the second control wire C2. For example, the second section of the second control wire C2 may be parallel to the data line 171 between the pixel electrode 191 and the data line 171.

The first control wire C1 extends in the first direction and may cross both the second curved portion and the first curved portion in the middle region of the pixel area.

The first control wire C1 and the second control wire C2 may overlap each other near the second curved portion. The first contact hole CH1 for connecting the first control wire C1 and the second control wire C2 is formed in the position in which the first control wire C1 and the second control wire C2 are overlapped.

A structure in which the first control wire C1 and the second control wire C2 are connected will now be described.

The first control wire C1 is formed on the first substrate 110, and the gate insulating layer 140 is formed on the first control wire C1. The first control wire C1 may be formed on the same layer as the gate line 121, and it may be simultaneously formed when the gate line 121 is formed.

The second control wire C2 is formed on the gate insulating layer 140. In some embodiment, a semiconductor layer (not shown) may be formed below the second control wire C2. The second control wire C2 may be formed on the same layer as the data line 171, and it may be simultaneously formed when the data line 171 is formed. The first passivation layer 180n, the second passivation layer 180q, and the insulating layer 180z are formed on the second control wire C2. The first contact hole CH1 exposing the first control wire C1 and the second control wire C2 is formed in the gate insulating layer 140, the first passivation layer 180n, the second passivation layer 180q, and the insulating layer 180z.

The connecting electrode 317 connecting the first control wire C1 and the second control wire C2 is formed in the first contact hole CH1. The connecting electrode 317 may be formed when the pixel electrode 191 is formed, and it may be made of the same material as the pixel electrode 191.

The power-connecting wire PLL may have structures analogous to structures of the control wire CL described with reference to FIGS. 6 and 7.

The accompanying drawings and the detailed description of the disclosure are illustrative. Various modifications and embodiments are possible within the scope defined by the appended claims.

What is claimed is:

1. A display device comprising:
a plurality of gate lines extending in a first direction;
a plurality of data lines extending in a second direction;
a gate driver configured to apply gate signals to the gate lines;
a data driver configured to apply data voltages to the data lines;
a plurality of pixels electrically connected to the plurality of gate lines and the plurality of data lines; and
a control wire set that overlaps an area of a first pixel of the plurality of pixels, electrically interconnects the gate driver and the data driver, and is configured to transmit a control signal from the data driver to the gate driver.

2. The display device of claim 1, wherein
the control wire set includes:
a first control wire and a second control wire, wherein the first control wire extends in the first direction and is electrically connected between the gate driver and the second control wire, and wherein the second control wire extends in the second direction and is electrically connected between the data driver and the first control wire.

3. The display device of claim 2, wherein
the first control wire is disposed on the same layer as the plurality of gate lines.

4. The display device of claim 3, wherein
the first control wire is made of the same material as the plurality of gate lines.

5. The display device of claim 3, wherein
the second control wire is disposed on the same layer as the plurality of data lines, and the first control wire and the second control wire are interconnected through a first contact hole.

6. The display device of claim 5, wherein
the second control wire is made of the same material as the plurality of data lines.

7. The display device of claim 1, wherein
the control signal includes at least one of a frame start signal and a clock signal for controlling operation of the gate driver.

8. The display device of claim 1, further comprising:
a power wire set connected to the plurality of pixels; and
a power-connecting wire set that overlaps an area of a second pixel of the plurality of pixels, electrically interconnect the data driver and the power wire set, and is configured to transmit a power voltage from the data driver to the power wire.

9. The display device of claim 8, wherein
the power-connecting wire set includes:
a first power-connecting wire and a second power-connecting wire, wherein the first power-connecting wire extends in the first direction and is electrically connected between the power wire set and the second power-connecting wire, and wherein the second power-connecting wire extends in the second direction and is electrically connected between the data driver and the first power-connecting wire.

10. The display device of claim 9, wherein
the first power-connecting wire and the second power-connecting wire are disposed on different layers, and the first power-connecting wire and the second power-connecting wire are interconnected through a second contact hole.

11. The display device of claim 8, wherein
the power voltage includes at least one of the common voltage and the storage voltage that are applied to the plurality of pixels.

12. The display device of claim 1, further comprising
a substrate including a display area in which the plurality of pixels are disposed and a non-display area abutting the display area,
wherein portions of the non-display area is folded to a rear surface of the display area along a first folding line and a second folding line of the second direction and along a third folding line of the first direction.

13. The display device of claim 12, wherein a portion of the non-display area opposite the data driver with reference to the display area is cut along a cutting line of the first direction.

14. The display device of claim 13, wherein a portion of the non-display area that is defined by the first folding line and the third folding line is cut, and a portion of the non-display area that is defined by the second folding line and the third folding line is cut.

15. The display device of claim 1, wherein the first pixel includes:
a thin film transistor connected to one of data lines; and
a pixel electrode connected to the thin film transistor,
wherein the pixel electrode includes a horizontal stem, a vertical stem and a plurality of minute branches connected to the horizontal stem and the vertical stem.

16. The display device of claim 15, wherein the control wire set includes:
a first control wire overlapping the horizontal stem; and
a second control wire overlapping the vertical stem.

17. The display device of claim 16, wherein the first control wire and the second control wire overlap each other in a position at which geometric extensions of the horizontal stem and the vertical stem of the pixel electrode meet.

18. The display device of claim 16, wherein a pixel electrode of the first pixel has an opening which corresponds to the position where the first control wire and the second control wire overlap, the first control wire and the second control wire are connected through the first contact hole at the position.

19. The display device of claim 15, wherein the first pixel further includes a microcavity that is disposed on the pixel electrode and contains a liquid crystal layer.

20. The display device of claim 1, wherein a data line of data lines includes two straight portions and a bent portion connected between the two straight portions, wherein the bent portion correspond to a middle region of the pixel area of the first pixel, the first control wire overlaps the bent portion, the second control wire has a bent structure, a first section of the second control wire extends substantially perpendicular to the first control wire, a second section of the second control wire extends substantially parallel to at least one of the two straight portions and is slanted with respect to the first section of the second control wire.

* * * * *